(12) United States Patent
Pi et al.

(10) Patent No.: US 6,744,948 B1
(45) Date of Patent: Jun. 1, 2004

(54) FIBER TAP MONITOR BASED ON EVANESCENT COUPLING

(75) Inventors: Bo Pi, Carlsbad, CA (US); Shulai Zhao, Encinitas, CA (US); Zheng Chen, Carlsbad, CA (US); Robert Morse, Carlsbad, CA (US); Jian Li, Carlsbad, CA (US)

(73) Assignee: Oluma, Inc., Carlsbad, CA (US)

( * ) Notice: Subject to any disclaimer, the term of this patent is extended or adjusted under 35 U.S.C. 154(b) by 0 days.

(21) Appl. No.: 10/064,201

(22) Filed: Jun. 20, 2002

Related U.S. Application Data (60) Provisional application No. 60/364,773, filed on Mar. 14, 2002, provisional application No. 60/303,554, filed on Jul. 5, 2001, and provisional application No. 60/300,147, filed on Jun. 20, 2001.

(51) Int. Cl.[7] .................................................. G02B 6/26
(52) U.S. Cl. .............................. 385/30; 385/28; 385/48
(58) Field of Search ............................ 385/27, 28, 30, 385/42, 48, 140

(56) References Cited

U.S. PATENT DOCUMENTS

| 4,021,097 A | 5/1977 | McMahon |
| 4,136,929 A | 1/1979 | Suzaki |
| 4,259,016 A | 3/1981 | Schiffner |

(List continued on next page.)

FOREIGN PATENT DOCUMENTS

| DE | 28 12 346 A1 | 3/1978 |
| EP | 0178045 A1 | 4/1986 |
| FR | 2613844 A1 | 10/1988 |
| JP | 52-14430 A2 | 2/1977 |
| JP | 60-131503 | 7/1985 |
| JP | 1-255803 | 10/1989 |
| JP | 4-31801 | 2/1992 |

OTHER PUBLICATIONS

McCallion et al., "Side–polished fiber provides functionality and transparency," (Abstract) Laser Focus World, vol. 34, No. 9, p. S19–20, S22, S24, PennWell Publishing, Sep., 1998.

Das et al., "Automatic determination of the remaining cladding thickness of a single–mode fiber half–coupler," (Abstract) Optics Letters, vol. 19, No. 6, p. 384–6, Mar. 15, 1994.

Ishikawa et al., "A new optical attenuator using the thermal diffusion of W–cladding fiber," (Abstract) MOC/Grin '97 Technical Digest of the 6[th]Microoptics Conf./14th Iopical Meeting on Gradient–Index Optical Systems in Tokyo, Japan, p. (vii+432+27), 208–11, Oct. 1997.

Matejec et al., "Optical fiber with novel geometry for evanescent–wave sensing," (Abstract) Sensors and Actuator B, (Chemical), vol. B29, No. 1–3, p. 416–22, Elsevier Publishing, Oct. 1995.

Alonso et al., "Single–mode, optical–fiber sensors and tunable wavelength filters based on the resonant excitation of metal–clad modes," (Abstract) Applied Optics, vol. 33, No. 22, p. 5197–201, Aug. 1, 1994.

Tomita et al., "Leaky–mode loss of the second propagating mode in single–mode fibres with index well profiles," (Abstract) Applied Optics, vol. 24, No. 11, p. 1704–7, Jun. 1, 1995.

Leminger et al., "Determination of the variable core–to–surface spacing of single–mode fiber–coupler blocks," (Abstract) Optics Letters, vol. 12, No. 3, p. 211–13, Mar. 1987.

(List continued on next page.)

*Primary Examiner*—Edward J. Glick
*Assistant Examiner*—Therese Barber
(74) *Attorney, Agent, or Firm*—Fish & Richardson P.C.

(57) ABSTRACT

Fiber tap monitors formed on side-polished fiber coupling ports based on evanescent coupling.

24 Claims, 11 Drawing Sheets

U.S. PATENT DOCUMENTS

| | | | |
|---|---|---|---|
| 4,301,543 A | 11/1981 | Palmer | |
| 4,302,071 A | 11/1981 | Winzer | |
| 4,307,933 A | 12/1981 | Palmer et al. | |
| 4,315,666 A | 2/1982 | Hicks, Jr. | |
| 4,378,539 A | 3/1983 | Swanson | |
| 4,392,712 A | 7/1983 | Ozeki | |
| 4,431,260 A | 2/1984 | Palmer | |
| 4,453,802 A * | 6/1984 | Bridges et al. | 385/30 |
| 4,493,528 A | 1/1985 | Shaw et al. | |
| 4,536,058 A | 8/1985 | Shaw et al. | |
| 4,556,279 A | 12/1985 | Shaw et al. | |
| 4,564,262 A | 1/1986 | Shaw | |
| 4,601,541 A | 7/1986 | Shaw et al. | |
| 4,688,882 A | 8/1987 | Failes | |
| 4,795,226 A * | 1/1989 | Bennion et al. | 385/12 |
| 4,828,350 A | 5/1989 | Kim et al. | |
| 4,869,567 A | 9/1989 | Millar et al. | |
| 4,896,932 A | 1/1990 | Cassidy | |
| 4,900,118 A | 2/1990 | Yanagawa et al. | |
| 4,986,624 A | 1/1991 | Sorin et al. | |
| 4,991,922 A | 2/1991 | Dahlgren | |
| 5,029,961 A | 7/1991 | Suzuki et al. | |
| 5,042,896 A | 8/1991 | Dahlgren | 385/31 |
| 5,080,506 A * | 1/1992 | Campbell et al. | 385/29 |
| 5,100,219 A | 3/1992 | Takahashi | 385/30 |
| 5,329,607 A | 7/1994 | Kamikawa et al. | 385/123 |
| 5,444,723 A | 8/1995 | Chandonnet et al. | 372/14 |
| 5,533,155 A | 7/1996 | Barberio et al. | 385/30 |
| 5,586,205 A | 12/1996 | Chen et al. | 385/29 |
| 5,623,567 A | 4/1997 | Barberio et al. | 385/30 |
| 5,651,085 A | 7/1997 | Chia | 385/140 |
| 5,729,641 A | 3/1998 | Chandonnet et al. | 385/2 |
| 5,781,675 A | 7/1998 | Tseng et al. | 385/30 |
| 5,809,188 A | 9/1998 | Tseng et al. | 385/37 |
| 5,841,926 A | 11/1998 | Takeuchi et al. | 385/123 |
| 5,854,864 A | 12/1998 | Knoesen et al. | 385/30 |
| 5,892,857 A | 4/1999 | McCallion | 385/1 |
| 5,900,983 A | 5/1999 | Ford et al. | 359/627 |
| 5,903,685 A | 5/1999 | Jones et al. | 385/12 |
| 5,915,063 A | 6/1999 | Colbourne et al. | 385/140 |
| 5,940,556 A | 8/1999 | Moslehi et al. | 385/28 |
| 5,963,291 A | 10/1999 | Wu et al. | 349/196 |
| 5,966,493 A | 10/1999 | Wagoner et al. | 385/140 |
| 5,970,201 A | 10/1999 | Anthony et al. | 385/140 |
| 6,011,881 A | 1/2000 | Moslehi et al. | 385/10 |
| 6,026,205 A | 2/2000 | McCallion et al. | 385/30 |
| 6,038,359 A | 3/2000 | Moslehi et al. | 385/42 |
| 6,052,220 A * | 4/2000 | Lawrence et al. | 359/341 |
| 6,058,226 A | 5/2000 | Starodubov | 385/12 |
| 6,130,984 A | 10/2000 | Shen et al. | 385/140 |
| 6,134,360 A | 10/2000 | Cheng et al. | 385/39 |
| 6,144,793 A | 11/2000 | Matsumoto et al. | 385/140 |
| 6,185,358 B1 | 2/2001 | Park | 385/140 |
| 6,490,391 B1 | 12/2002 | Zhao et al. | 385/30 |
| 6,501,875 B2 | 12/2002 | Zhao et al. | 385/30 |
| 6,625,349 B2 | 9/2003 | Zhao et al. | |

OTHER PUBLICATIONS

Morshnev et al., "A fiber thermo–optical attenuator," (Abstract) Source: Radiotekhnika i Elektronika, Translated in: Soviet Journal of Communications Technology & Electronics, vol. 30, No. 9, p. 148–50, Sep., 1985.

Takahashi Mitsuo, "Variable light attenuator of improved air–gap type with extremely low returning light,"(Abstract) Conf. Record—IEEE Instrumentation and Measurement Tech. Conf. 2, p. 947–950, 1994.

Schmidt et al., "New design approach for a programmable optical attenuator," (Abstract) Hewiett–Packard Journal, v. 46, n. 1, p. 34–39, 1995.

Hayata et al., "Algebraically decaying modes of dielectric planer waveguides," Optics Letters, vol. 20, No. 10, p. 1131–32, May 15, 1995.

Vengsarkar et al., "Photoinduced refractive–index changes in two–mode, elliptical–core fibers: sensing applications," Optics Letters, vol. 16, No. 19, p. 1541–43, Oct. 1, 1991.

Pantchev et al., "Method of Refractive index Profile Reconstruction from Effective Index of Planar Optical Monomode Waveguides: Applications to Potassium Ion–Exchanged Waveguides," IEEE Journal of Quantum Electronics, vol. 29, No. 1, p. 154–60, Jan. 1993.

Ikeda et al., "Analysis of the Attenuation Ratio of MQW Optical Intensity Modulator for 1.55 $\mu$m Wavelength Taking Account of Electron Wave Function Leakage," IEEE Journal of Quantum Electronics, vol. 32, No. 2, p. 284–92, Feb. 1996.

S. Masuda, "Variable attenuator for use in single–mode fiber transmission systems," Applied Optics, vol. 19, No. 14, p. 2435–38, Jul 15, 1980.

Huang et al., "Field–Induced Waveguides and Their Applications to Modulators," IEEE Journal of Quantum Electronics, vol. 29, No. 4, p. 1131–1143, Apr. 1993.

Iztkovich et al., "In–Situ Investigation of Coupling Between a Fibre and a Slab Waveguide,"Tel Aviv University, Israel, May 29, 1990.

Brierley et al., "Amplitude and phase characterization of polished directional half–couplers with variable refractive index overlays," Optical Engineering, vol. 27, No. 1, p. 045–49, Jan. 1988.

Scholl et al., "In–line fiber optical attenuator and powermeter," SPIE vol. 1792 Components for Fiber Optic Application VII, p. 65–70, 1992.

Tsujimoto et al., "Fabrication of Low–Loss 3 dB Couplers With Multimode Optical Fibres," Electronics Letters, vol. 14, No. 5, Mar. 2, 1978.

* cited by examiner

FIG. 8
VOA tap array

FIBER TAP MONITOR BASED ON EVANESCENT COUPLING

CROSS REFERENCE TO RELATED APPLICATIONS

This application claims the benefits of U.S. Provisional Application Nos. 60/300,147 filed on Jun. 20, 2001, 60/303,554 filed on Jul. 5, 2001, and 60/364,773 filed on Mar. 14, 2002, the disclosures of which are incorporated herein by reference.

BACKGROUND OF INVENTION

This application relates to optical fibers and fiber devices, and more particularly, to optical monitoring guided light in fibers.

Optical fibers can be used to transmit or process light in a variety of applications, including delivering light to or receiving light from integrated optical components or devices formed on substrates, transmitting information channels in wavelength-division multiplexed optical communication devices and systems, forming fiber optic switch matrix devices or fiber array to array connector, and producing optical gain for optical amplification or laser oscillation. Optical fibers essentially operate as "light pipes" to confine light within the fiber boundary and transfer light from one point to another.

A typical fiber may be simplified as a fiber core and a cladding layer surrounding the fiber core. The refractive Index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism to spatially confine the optical energy of the light rays in one or more selected fiber modes to guide the optical energy along the fiber core. Similarly, optical waveguides on substrates may also operate as light pipes to confine and transfer port light and may be used in integrated optical devices where optical elements, opto-electronic elements, or MEMS elements are integrated on one or more substrates.

The guided optical energy in the fiber or waveguide, however, is not completely confined within the core of the fiber or waveguide. In a fiber, for example, a portion of the optical energy can "leak" through the interface between the fiber core and the cladding via an evanescent field that essentially decays exponentially with the distance from the core-cladding interface. The distance for a decay in the electric field of the guided light is less than or on the order of one wavelength of the guided optical energy. This evanescent leakage may be used to couple optical energy into or out of the fiber core, or alternatively, to perturb the guided optical energy in the fiber core.

SUMMARY OF INVENTION

This application includes fiber tap monitors that detect or monitor guided light in a fiber or a planar waveguide by using an optical detector to receive a small amount of evanescent light obtained from a side-polished coupling port of the fiber or waveguide. The fiber or the planar waveguide is engaged to or formed on a substrate of a suitable material such as a semiconductor or glass.

DETAILED DESCRIPTION

The fiber tap monitors under various embodiments of this application are in part based on the recognition that the power of the evanescent light of the guided light in the fiber or waveguide may be used to represent the power of the guided light. A small amount of the evanescent light may be accessed from a side-polished fiber or waveguide and then may be coupled into an optical detector. When the percentage of the received evanescent light out of the total guide light in the fiber is known, the power of the detected evanescent light can be used to measure the absolute power within the fiber. In particular, the location at which the evanescent coupling may be selected so that only a desired small percentage of the guided light, e.g., a few percent or less (i.e., a fraction of one percent) is coupled into the optical detector. Under such coupling conditions, the impact due to operation of the tap monitor on the guided light in the fiber is small. In addition, such a tap monitor essentially does not change the original polarization state of the guided light when the fiber is the polarization-maintaining type.

The fiber tap monitors may be integrated on a substrate. One or more fibers may be integrated on or engaged to the substrate fabricated with one or more grooves. One portion of the cladding of each fiber is removed and polished to form a fiber coupling port as a part of the tap monitor. In general, the polished surface on the fiber cladding is sufficiently close to the fiber core so that optical energy can be coupled via evanescent fields out of the fiber core for optical monitoring. Two or more such fiber coupling ports may be formed at different positions in each fiber when needed. The following sections first describe the basic structures for integrating fibers onto substrates for forming side-polished fiber coupling ports based on evanescent coupling. Embodiments of fiber tap monitors based on such structures are then described in detail.

Figure 1:
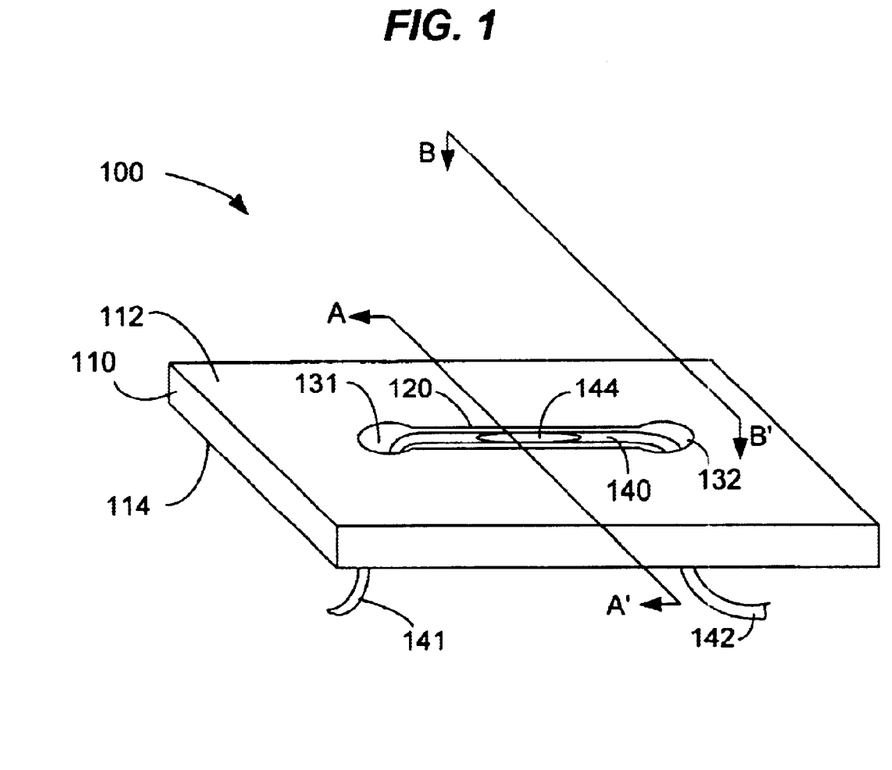
FIG. 1 shows one embodiment of a fiber device that integrates or engages a fiber to a substrate with a groove for positioning the fiber and openings for holding the fiber.
Figure 2A:
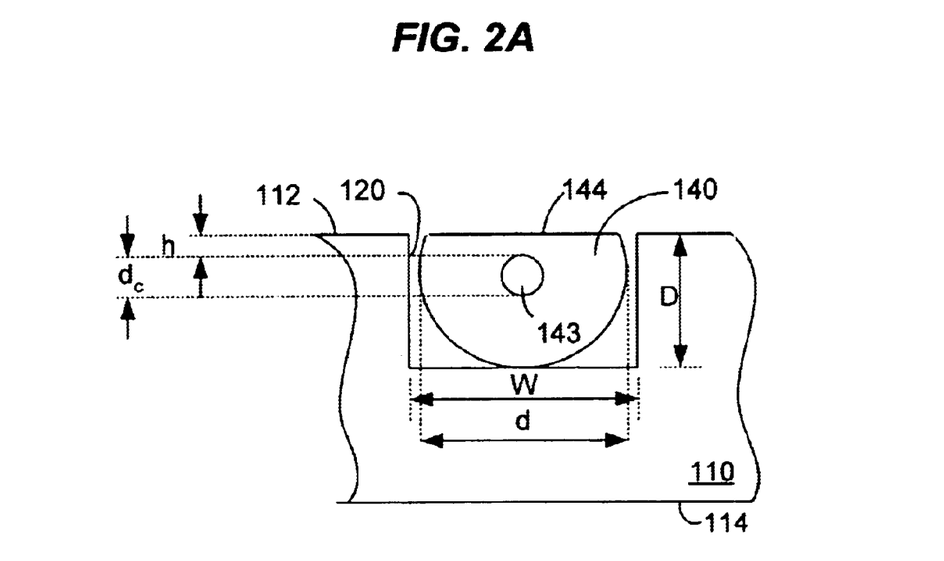
FIGS. 2A and 2B show a cross sectional view of the device in FIG. 1 along the direction AA" and a side view of the device in FIG. 1 along the direction BB", respectively.
Figure 2B:
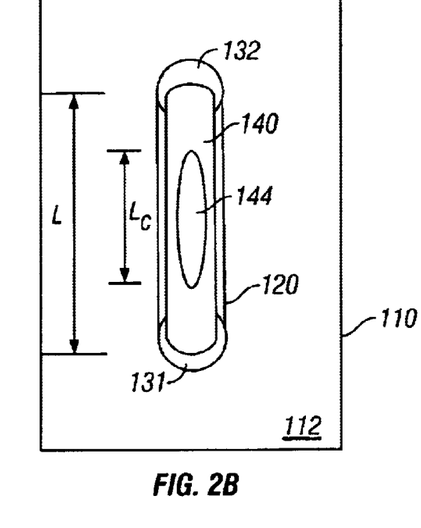

FIG. 1 shows one embodiment of a fiber device 100 where a fiber 140 is integrated or engaged to a substrate 110. The fiber device 100 may be used as a building block to construct a variety of fiber devices, including but not limited to, fiber optical monitors, fiber couplers, fiber attenuators, fiber modulators, fiber beam splitters, optical fiber switches, and fiber frequency-division multiplexers. FIGS. 2A and 2B show additional details of the fiber device 100.

The substrate 110 may be formed of various materials, such as semiconductors, insulators including dielectric materials (e.g., a glass, a quartz, a crystal, etc.), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

Figure 2C:
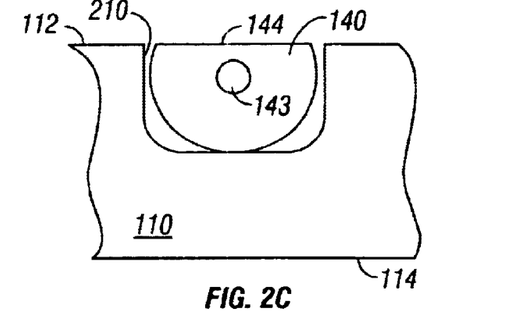
FIGS. 2C and 2D show examples of two different cross sections for grooves shown in FIG. 1.
Figure 2D:
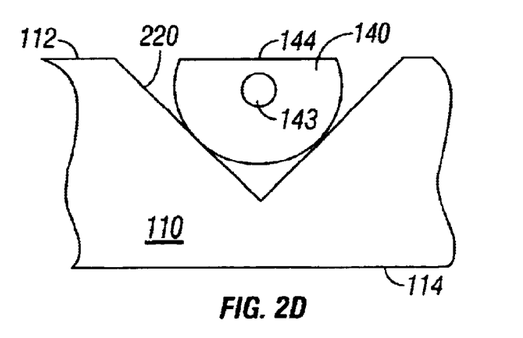

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 220 in FIG. 2D. The cross sections are generally not so limited and may also be other shapes as well, including rectangular as shown in FIG. 2A, U-shaped as shown by the groove 210 in FIG. 2C, a circularly shape or other suitable shapes. Unless specifically indicated otherwise, the techniques, structures, and applications disclosed in this application are generally applicable to grooves of different shapes.

Figure 2E:
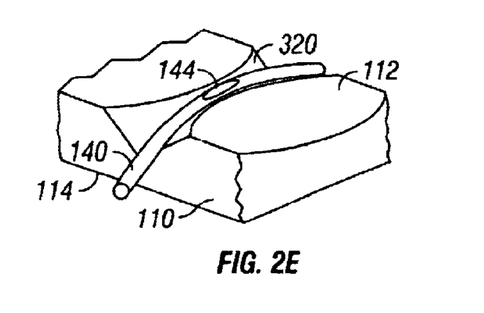
FIG. 2E shows one example of a V groove with varying depth and width.

The width, W, of the groove 120 is generally greater than the diameter, d, of the fiber 140 and may either remain a constant or vary spatially along the groove 120, e.g., increasing from the center towards the two ends as illustrated in the V groove 220 in FIG. 2E. The length, L, of the groove 120 may vary from one grove to another and can be determined based on specific requirements of applications. The depth D of the groove 120 may be a constant or may vary along the groove 120, e.g., increasing from the center towards the two ends as shown in FIG. 2E. In general, at least a portion of the groove 120 has a depth D to expose a portion of the fiber cladding of the fiber 140 above the surface 112 while still keeping the fiber core below the surface 112. Sometimes, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For a groove with a rectangular cross section as shown in FIG. 2A, at least a portion of the groove 120 has a depth D less than the fiber diameter d but greater than the sum of the fiber radius r=d/2 and radius of the fiber core $r_c=d_c/2$. This portion of the groove 120 exposes partial fiber cladding of the fiber 140 above the surface 112 while still keeping the fiber core below the surface 12. Other portions of the groove 120 may have a :depth that is at least the fiber diameter d so that the fiber can be essentially placed in the groove 120 below the surface 112. However, in certain applications, the depth D of the entire groove 120 may be greater than fiber diameter d to avoid evanescent coupling of a guided mode. Unless otherwise indicated, the following description will assume that at least a portion of a groove 120 to expose a portion of the fiber cladding above the surface 112 and adjacent portions sufficiently deep to keep the fiber below the surface 112. In case of the rectangular groove 120, the central portion of the groove 120 may have a depth D less than d but greater than (d+dc)/2 while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially, full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length $L_C$ that is above the fiber core 143 and is substantially coplanar with the surface 112 of the substrate 110 as illustrated In FIG. 2B. When the spacing, h, between the flat surface 144 and the fiber core 143 is sufficiently small (e.g., on the order of or less than one wavelength of optical energy), the flat surface 144 can be used to couple optical energy into or out of the fiber core 144 through the evanescent fields outside the fiber core. Hence, the length, $L_C$, of the flat surface 144 approximately represents the optical coupling length for the fiber device 100. This coupling surface 144 may also be non-flat, e.g., curved to a certain extent, as long as it can transmit evanescent signals.

Alternatively, only one through hole 132 in the substrate 110 may be needed to engage the fiber 140 to form the fiber module for coupling with a waveguide module. As shown In the design 301 in FIG. 3A, the groove 120 may extend to one end side 310 of the substrate 110 so that one end 141 of the fiber 140 leaves the groove 120 without going through a through hole. In addition, FIG. 3B shows a conventional design 302 in which the groove 120 may extend to two opposing end sides 310 and 330 of the substrate 110 so that the fiber 140 is engaged to the groove 120 without relying on any through holes.

Figure 3A:
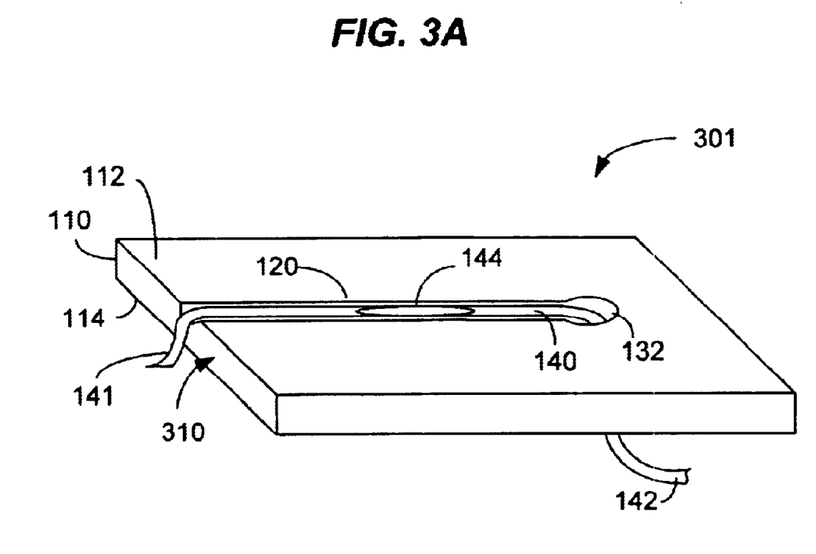
FIG. 3A shows a design to engage a fiber on to a substrate by using an elongated groove with a single through hole, where a portion of the fiber cladding is removed and polished to form a side-polished evanescent coupling port.
Figure 3B:
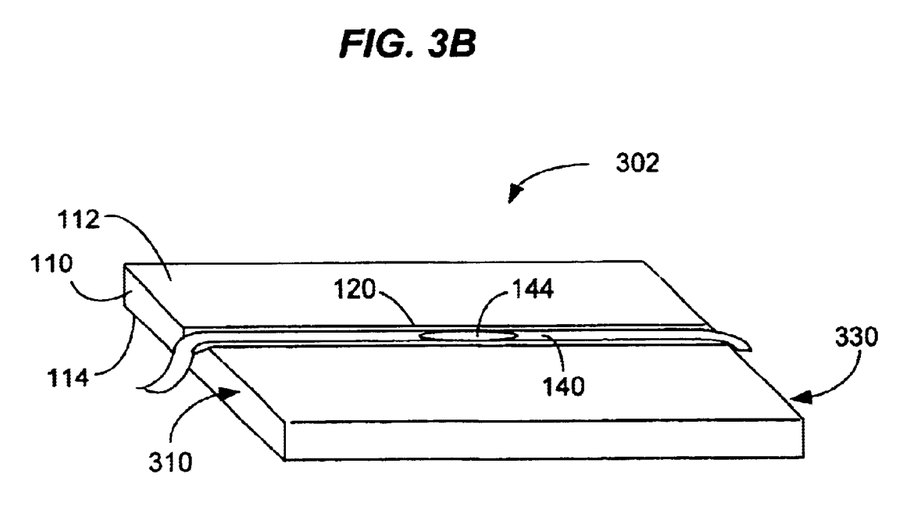
FIG. 3B shows another way of engaging a fiber onto a substrate without using through holes shown in FIG. 1, where a portion of the fiber cladding is removed and polished to form a side-polished evanescent coupling port.

Notably, the through holes in the substrate 110 shown in FIGS. 1 and 3A, may be used to engage a single fiber on both sides of a substrate to form two or more side-polished coupling ports for evanescent coupling. For example, two grooves may be formed on opposite sides of the substrate 110 to share a common through hole at ends. A fiber may be threaded through the substrate 110 to have one fiber portion in the groove on one side and another fiber portion in the groove on the opposite side of the substrate 110. Hence, fiber coupling ports may be formed in the same fiber on both sides of the substrate 110. This structure may be use to construct a variety of fiber devices, including stacking two substrates to provide optical coupling from a fiber in one substrate to another fiber in another substrate. The fabrication of this double-sided fiber structure may be implemented by polishing the substrate and the fiber on both sides as described. The following sections describe embodiments of fiber tap monitors based on the above fiber devices with one or more side-polished fibers.

Figure 4:
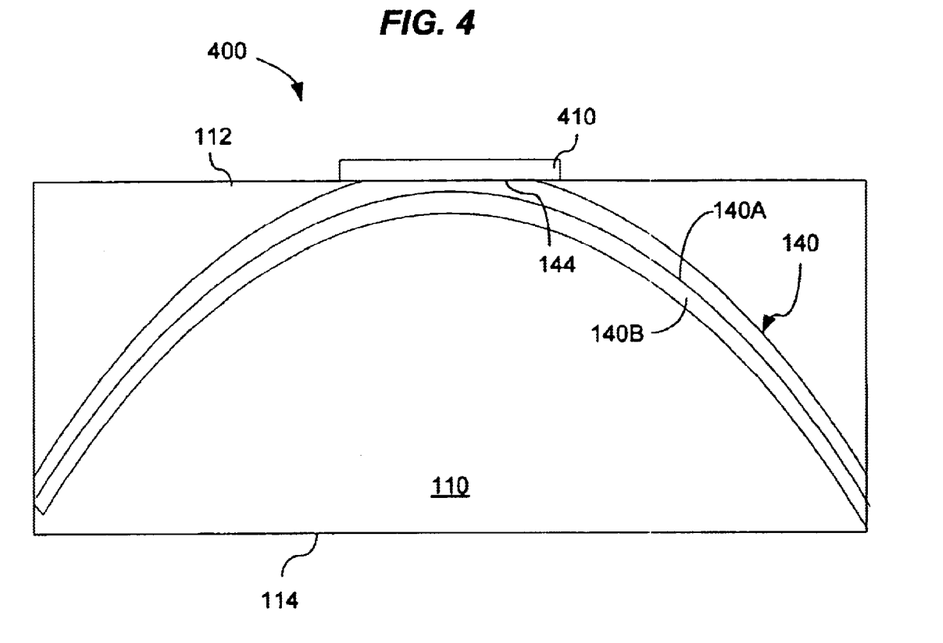
FIGS. 4 and 5 show two embodiments of fiber tap monitors formed over side-polished fiber coupling ports of fibers.

FIG. 4 shows one embodiment of a fiber tap monitor 400. A fiber 140 with a core 140A and a cladding 140B has one portion whose cladding is partially removed to form a surface 144. The surface 144 is within the extent of the evanescent field of the guided light in the fiber core 140A. The surface 144 is polished to operate as the fiber coupling port. An optical detector 410, such as a photodiode, is then positioned to receive and detect the evanescent light at the surface 144. The amount of evanescent light at the surface 144 may be set at a desired percentage of the total guide ling in the fiber 140 by controlling the distance between the fiber core 140A and the surface 144 during the fabrication phase. The evanescent light decays in magnitude exponentially with the distance. Hence, the closer the surface 144 to the fiber core 144A, the higher the percentage of the evanescent light being coupled to the optical detector 410.

In the device 400, the substrate 110 is shown to operate as a fiber support that holds the fiber 140. The substrate 110 has two opposing surfaces 112 and 114. A depth-varying groove 120 may be formed on the surface 112 of the substrate 110. When the fiber 140 is placed in the groove 120, the cladding of the fiber portion where the surface 144 is formed protrudes above the surface 112. The protruded cladding is then removed to form the surface 144 which is approximately coplanar with the surfaced 112. Other portions of the fiber 140 in the groove 120 stay under the surface 112. As described above, different ways may be used to engage the fiber 140 to the substrate 110 to form the fiber coupling port 144 for evanescent coupling.

Figure 5:
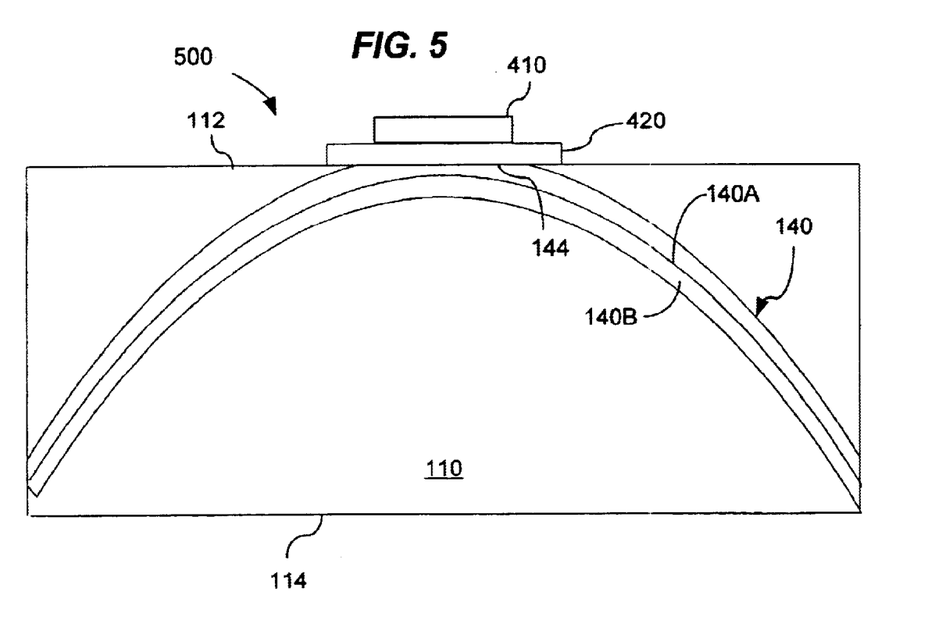

FIG. 5 shows, another embodiment 500 of a fiber tap monitor. Instead of directly placing the optical detector 410 on the surface 144, the tap monitor 500 implements a high-index transparent overlay layer 420 over the surface 144. The overlay 420 may have an index higher than that of the fiber cladding 140B to assist extraction of the evanescent light out of the guide mode of the fiber 140. The optical detector 410 is then placed on the overlay 420 to receive and detect the light.

The fiber 140 generally may be any fiber, including single-mode fibers and multi-mode fibers. In particular, the fiber 140 may be a polarization maintaining (PM) fiber to preserve the polarization state of light to be transmitted. When the tap monitor 400 or 500 is based on such a PM fiber 140, the tap monitor itself is also polarization maintaining so that the guided light can maintain its own polarization even when the tap monitor extracts a small fraction of light for detection.

Figure 6:
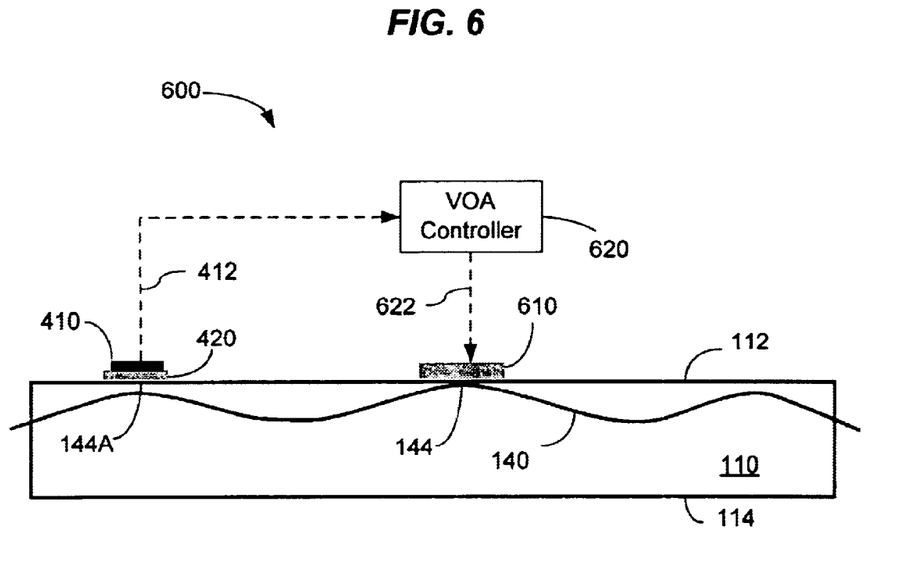
FIGS. 6 and 7 show exemplary fiber variable optical attenuators in combination with fiber tap monitors.

FIGS. 6 and 7 show fiber variable optical attenuators (VOAs) 600 and 700 based on the tap monitor 500. In FIG. 6, the fiber 140 is configured to have two fiber coupling ports 144 and 144A. An adjustable optical element 610 is formed at the port 144 to extract light out of the fiber 140 via evanescent coupling to control the power of the remaining guided light In the fiber 140. The optical element 610 controls the amount of extraction in response to a control signal 622 from a VOA controller 620. An adjustable optical grating based on electro-optic material or thermo-optic material, for example, may be used as the optical element 610 to interact with the evanescent field so as to control the amount light coupled out of the fiber 140. The other fiber coupling port 144A is used to form a fiber tap monitor as described above to monitor the power level of the guided light in the fiber 140. The optical detector 410 produces a detector signal 412 indicating the power level of the guided light. The VOA controller 620 controls the amount of attenuation (extraction) according to the signal 412 to set the guided light at a desired power level. This forms a dynamic loop that maintains the power level of the guided light.

Figure 7:
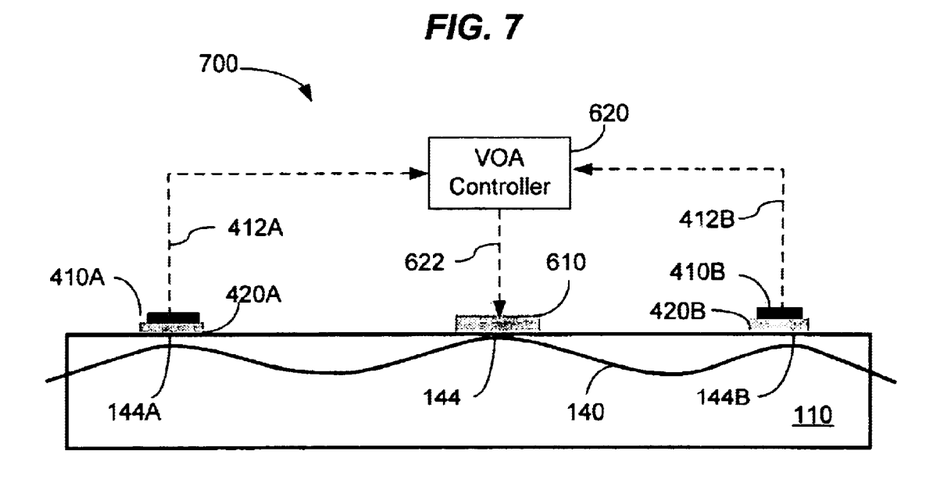

In FIG. 7 the fiber 140 has three fiber coupling ports 144A, 144, and 144B to support the first tap monitor, the VOA 610, and a second tap monitor, respectively. The detector signals 412A and 412B from the two tap monitors allow the VOA controller 620 to determine the power of received signal and the power of output signal after passing through the VOA 610. Hence, an attenuation ratio can be maintained at desired level even when the received power fluctuates. The attenuation ratio can certainly be adjusted to any desirable level.

Notably, the coupling port 144A for a fiber tap monitor and the coupling port 144 for the VOA 610 may have different distances from the fiber core 144A to their respective surfaces to have different evanescent coupling strengths. In some applications, the surface for the coupling port 144 for optical attenuation is closer to the fiber core 140A than the surface for the coupling port 144A for optical tapping because the evanescent taping should affect the energy flow in the fiber as little as possible. This feature is schematically illustrated in both FIGS. 6 and 7.

Figure 8:
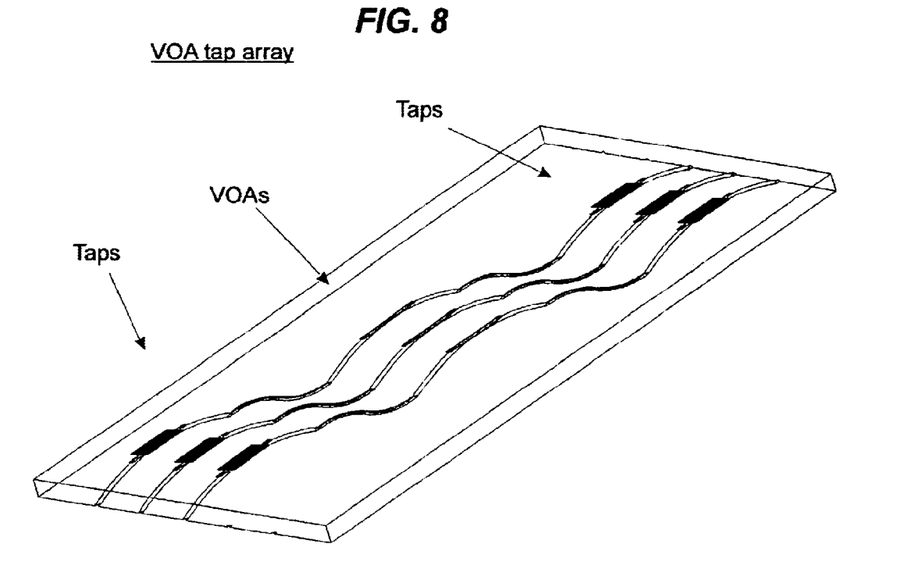
FIG. 8 shows fiber tap monitors fabricated in arrays over a substrate that has elongated grooves for holding fibers.

FIG. 8 shows multiple fiber tap monitors may be simultaneously fabricated and formed by using a single substrate 110. Desired grooves are first fabricated on the substrate 110 and then the fibers are engaged to the grooves. The fiber coupling ports are fabricated on the fibers. Next, the tap monitors are formed, e.g., in form of an array. Finally, the substrate may be diced into separate modules each may have one or more tap monitors. Certainly, as illustrated, the VOAs may also be formed along with the tap monitors.

As described above, each groove may be fabricated to have one or more though holes penetrating the substrate. A fiber may be engaged to the substrate by passing a portion through the hole so that the fiber is present on both sides of the substrate. In fact, fiber coupling ports of the same fiber may be formed on both sides of the substrates. Hence, two tap monitors may be formed on opposite sides of the substrate. The above tap monitor designs for fibers may also be applied for planar waveguides formed on substrates.

Referring back to FIG. 6, the VOA 610 may be designed to control and adjust the optical power in the fiber 140 by variable evanescent coupling. The following describes a thermally-controlled variable optical attenuator formed on a side optical coupling port of a fiber engaged to a substrate or a planar waveguide formed over a substrate. In this embodiment, a thermo-optic dielectric overlay layer is formed over the optical coupling port to extract optical energy out of a guided mode. Two heating elements, one formed on top of the overlay layer and another formed underneath the substrate, are used to control and modulate the temperature of the overlay layer. This temperature control or modulation changes the refractive index of the overlay layer and hence changes the amount of energy coupling by the thermo-optic overlay layer. As a result, the optical energy remaining in the guided mode is changed.

The extraction of optical energy out of the evanescent field of a guided mode of a fiber or planar waveguide is achieved by a side optical coupling port. In a fiber, this side coupling port can be formed by removing a portion of the fiber cladding to form a cladding surface where the evanescent field is preset with a sufficient field strength. In a planar waveguide, this side coupling port may be a surface either on a cladding layer that is sufficiently close to the waveguide core or directly formed on the waveguide core. A thermo-optic dielectric overlay layer is formed over the surface of the coupling port to extract the guided energy. In general, the overlay layer is substantially transparent and has a refractive index higher than that of the fiber cladding or the waveguide cladding to assist extraction of the evanescent light out of the guided mode. A temperature control mechanism is implemented to control the temperature of the overlay layer and ultimately the energy in the guided mode.

Figure 9A:
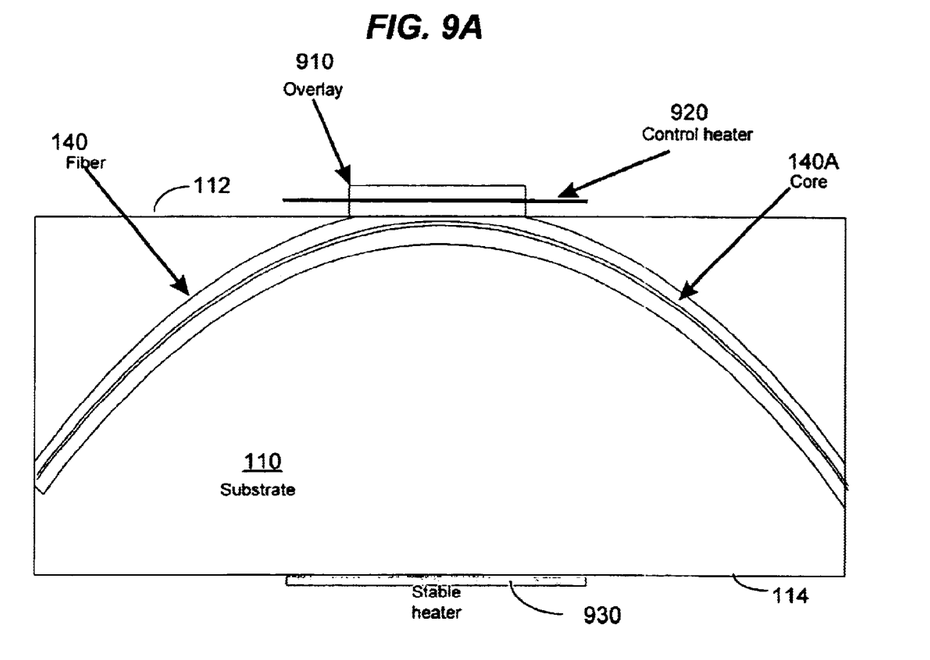
FIGS. 9A and 9B show two views of one embodiment of such a fiber variable optical attenuator in a fiber that is engaged to an elongated groove of a substrate.
Figure 9B:
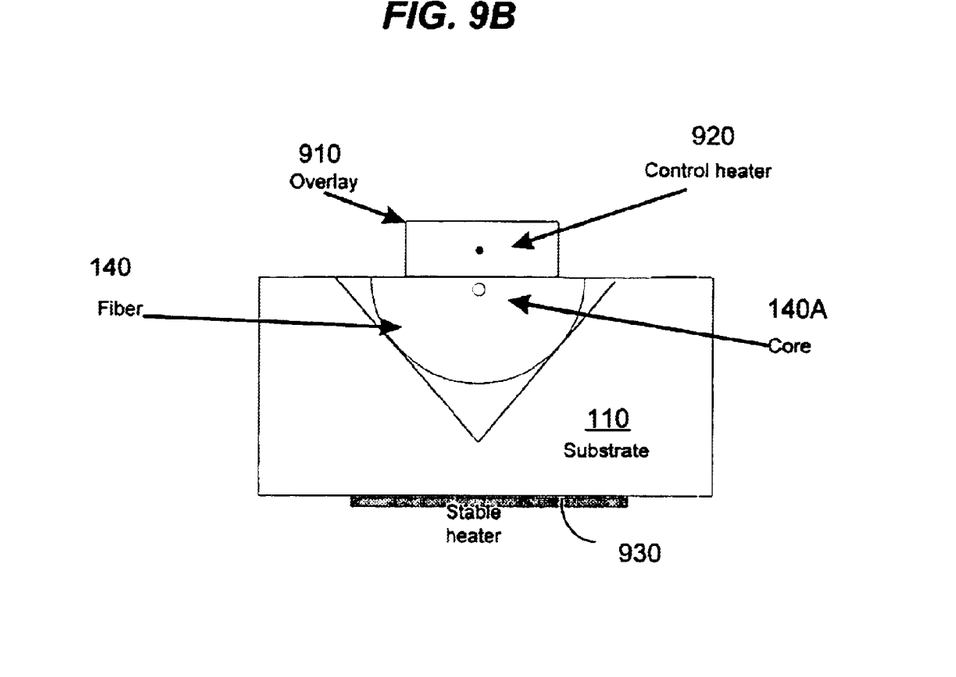

FIGS. 9A and 9B show one embodiment of such a VOA in a fiber 140 that is engaged to an elongated groove 120 of a substrate 110. The groove 120 on one substrate surface 112 has a varying depth and at least one portion that partially exposes the fiber cladding 140B of the fiber 140 above the substrate surface 112. Hence, the exposed or protruded portion of the fiber cladding 140B can be removed to form a surface 144 that is substantially coplanar with the substrate surface 112. This may be done by, e.g., chemical mechanical polishing or other suitable process. The cladding surface 144 is then used as the side coupling port to access the evanescent field of the guided mode of the fiber 140. The thermo-optic overlay layer is represented by the numeral 910 and may be formed locally over the surface 144. A controllable heating element 920 is coupled to the overlay layer 910 to change its A temperature. On the opposite substrate surface 114 of the substrate 110, a second heating element 930 is formed across the side coupling surface 144. The collective operation of the both heating elements 920 and 930 controls the temperature of the overlay layer 910 and hence the operation of the VOA.

In one embodiment, the heating element 930 on the opposite substrate surface 114 may be controlled to supply constant heat to the device to provide a substantially constant temperature bias in the overlay layer 910. The heating element 920, on the other hand, is configured to supply varying heat to the overlay layer 910 to cause the temperature of the overlay layer 910 to change in response to a control signal. As a result, the guided optical energy in the fiber 140 changes its power as the control signal changes.

Both heating elements 920 and 930 may be electrical heating elements that are driven by electrical currents. In this implementation, the heating element 920 may be a conductor piece (a wire, a strip of a thin film, etc.) in contact with or buried within the overlay layer 910. A power supply is coupled to the conductor piece to provide the driving electric current. Similarly, the heating element 930 may also be a conductor piece coupled to its own electrical power supply. For example, the heating element 930 may include a piece of a metallic film over the substrate surface 114.

The fiber 140 generally may be any fiber, including single-mode fibers and multi-mode fibers. In particular, the fiber 140 may be a polarization maintaining (PM) fiber to preserve the polarization state of light that remains in the fiber 140.

Figure 10:
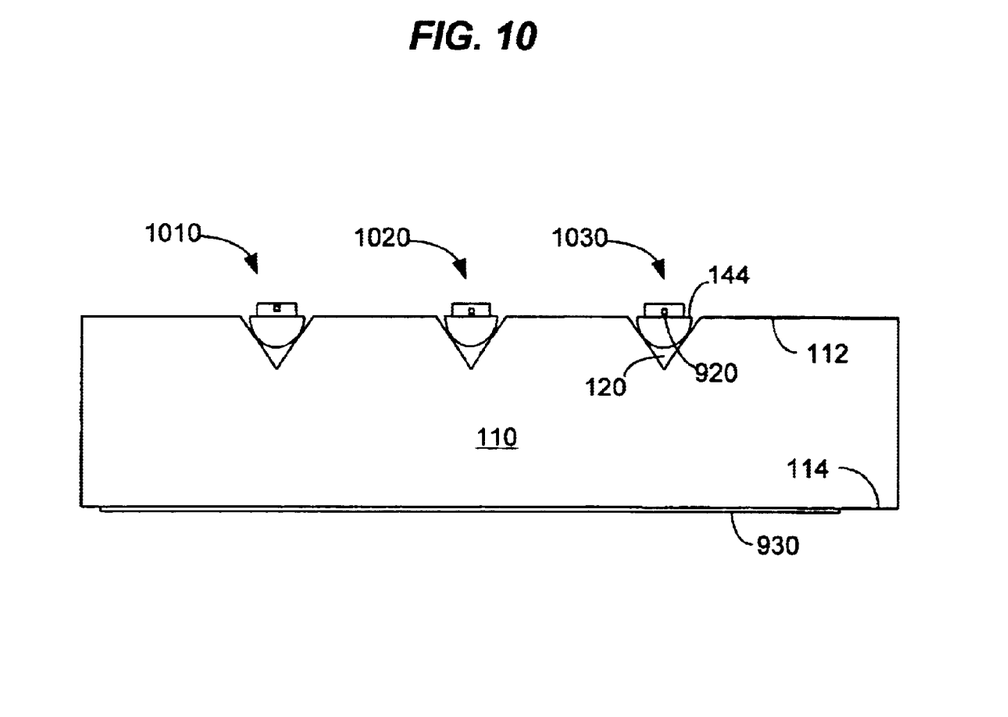
FIG. 10 shows an array of VOAs formed on a single substrate to share a common heating element on the opposite substrate surface.

FIG. 10 further shows an array of fiber VOAs 1010, 1020, and 1030 formed over one side 112 of the substrate 110 by sharing the same heating element 930 on the opposite side 114. Each heating element 920 in the fibers may be independently adjusted to control the optical attenuation in the respective fiber 140.

In the above-described tap monitors shown In FIGS. 5, 6, and 7, an optical transparent overlay layer 420 is formed between the optical detector 410 and the side-polished coupling surface 144 to assist the evanescent coupling. Alternatively, a transparent optical block with an angled side surface may be used where the optical detector is mounted on the angled side surface to receive the coupled signal. This technique is now described in detail in the following embodiments.

Figure 11:
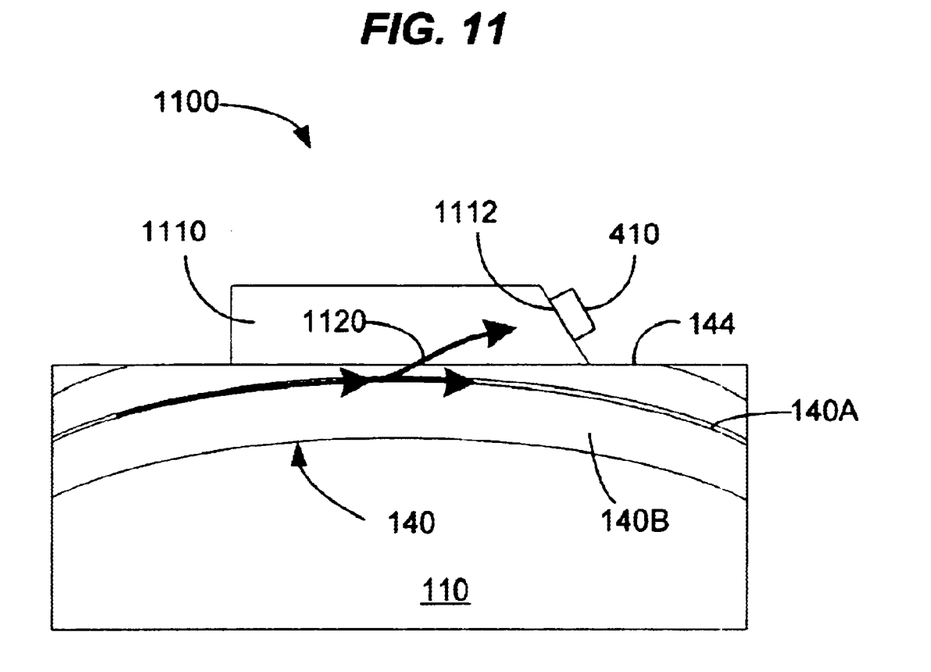
FIGS. 11 and 12 shows one embodiment of a tap monitor by using an angled overlay with a detector over an evanescent coupling port of a fiber or planar waveguide.

FIG. 11 shows one embodiment of a tap monitor system 1100 where a multi-mode waveguide overlay 1110 is formed above the side-polished fiber port 144 to evanescently extract a fraction of the guided signal in the fiber 140 to produce a monitor signal 1120 for the detector 410. The waveguide overlay 1110 is formed of a dielectric material with a refractive index greater than the refractive index of the fiber core 140A. Exemplary materials for the overlay 1110 include, among others, polymer materials, semiconductor materials, glass materials, plastic materials, and epoxy materials. The overlay 1110 may be a bulk block to allow for extracted light to propagate. The overlay 1110 is shown to be engaged to the surface 144 by using a thin adhesive material such as an optical epoxy, an optical gel, or an optical liquid. In addition, the waveguide overlay 1110 has an end facet 1112 on which the optical detector 410 is engaged with its sensing surface facing the waveguide overlay 1110. The end facet 1112 may be substantially perpendicular to the surface 144, or alternatively, form an acute angle with respect to the surface 144 as illustrated so that the coupled signal 1112 propagating in the waveguide overlay 1110 is approximately or substantially perpendicular to the end facet 112 and thus the sensing surface of the detector 410 for efficient detection. In essence, the overlay 1110 with an angled end facet 1112 effectuates an optical prism. The orientation of the end facet 1112 is determined by the geometry of the waveguide overlay 1110 and its index for a given polished fiber 140 in the substrate 110.

Figure 12:
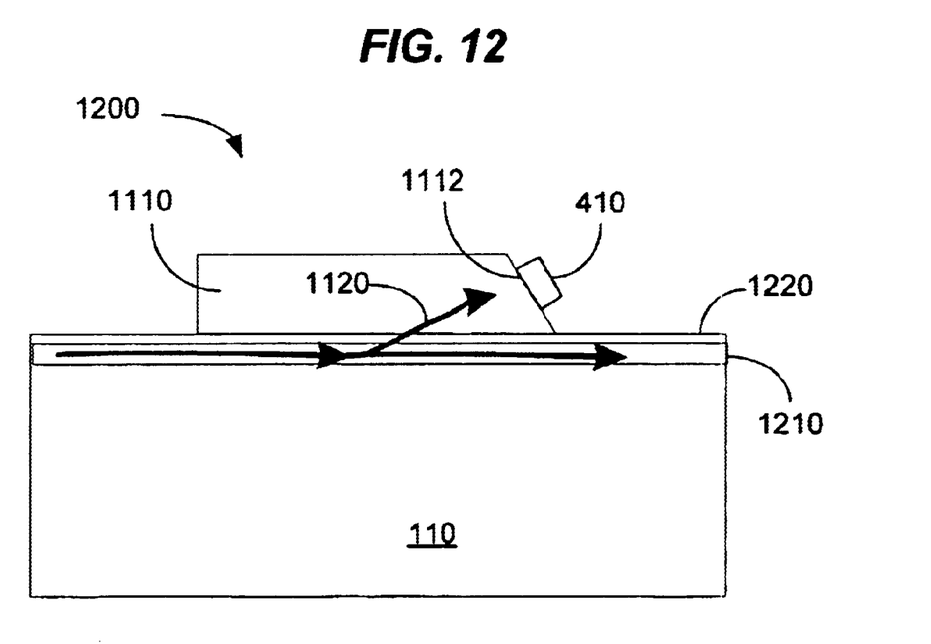

FIG. 12 shows another tap monitor system 1200 in a planar waveguide 1210 based on the design in FIG. 11. The planar waveguide 1210 is formed in the substrate 110 and may be implemented as, among others, a glass waveguide, a silicon waveguide, a doped glass waveguide with optical amplification functions. The waveguide overlay 1110 is engaged to the top surface of the waveguide 1210 by a thin adhesive material 1220 such as an optical epoxy, an optical gel, or an optical liquid. The index of the waveguide overlay 1110 is greater than that of the waveguide 1210 to allow for extracting light out of the guided mode via evanescent coupling.

Figure 13:
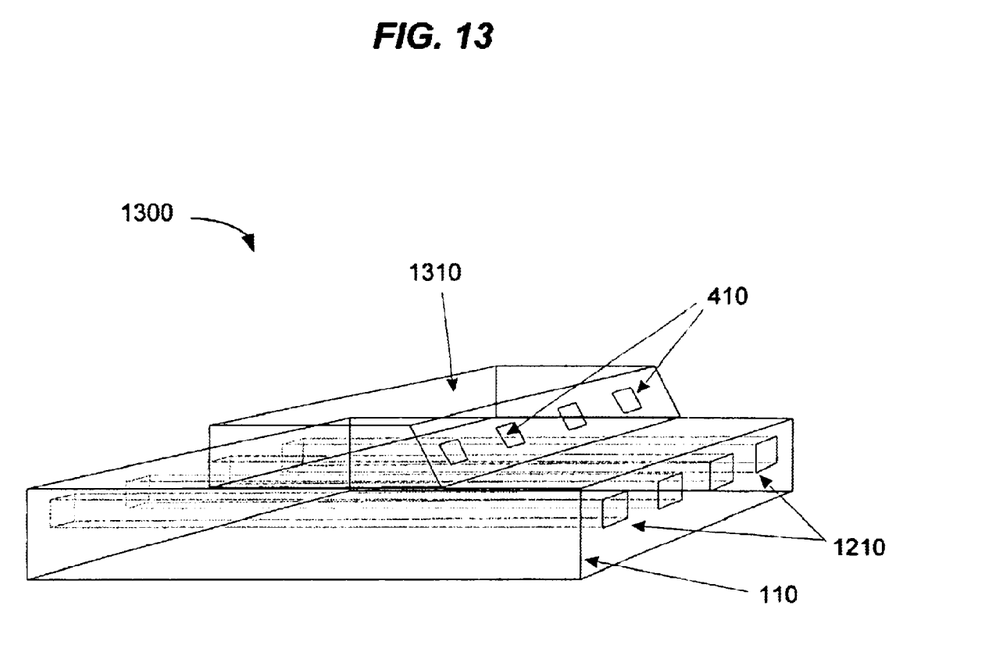
FIG. 13 shows an array of tap monitors based on the design in FIGS. 11 and 12.

FIG. 13 further shows a waveguide array system based on the design in FIG. 12. Multiple parallel planar waveguides 1210 are formed in the substrate 110. A single piece of the waveguide overlay 1310 is engaged on top of the substrate 110 to cover all waveguides 1210 so that different monitor signals can be evanescently extracted from different waveguides into the overlay 1310. Multiple detectors 410 are positioned and engaged to the angled end facet to respectively receive the different monitor signals. Alternatively, the single waveguide overlay may be replaced by an array of overlays respectively coupled to the underlying waveguides 1210 in the substrate 110. Such arrayed design may apply to an array of side-polished fibers engaged on the substrate 110.

Notably, the intensity of the extracted optical signal 1120 in the overlay 1110 that transmits through the angled facet 1112 and thus is received by the optical detector 410 has a dependence on the polarization of the signal 1120. The two orthogonal polarizations, the p component and s component, generally experience different reflectivities at the facet 1112. This effect of the polarization-dependent reflection is undesirable for the tap monitor because it introduces an error in monitoring the signal intensity of the guided light in the fiber or waveguide. The orientation of the angled facet 1112 may be designed to substantially equalize the optical reflectivites at the angled facet 1112 so that the received optical signal at the optical detector 410 is insensitive to the optical polarization.

Figure 14A:
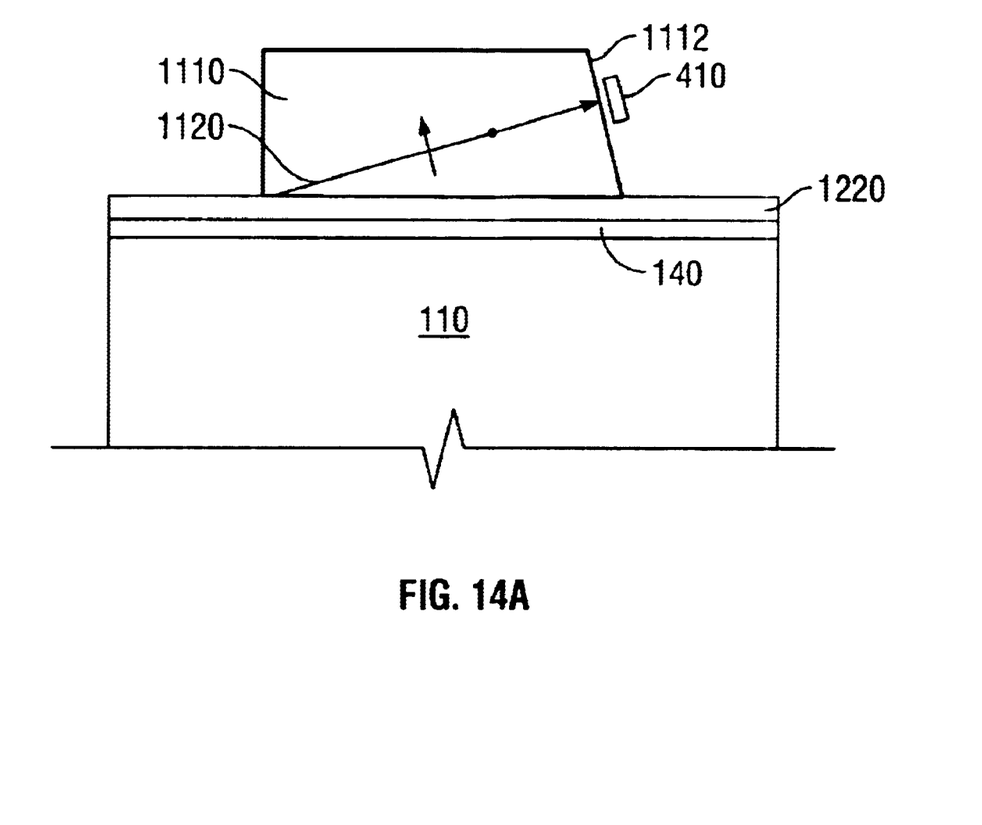
FIG. 14A shows polarizations In the device in FIGS. 11 and 12.

FIG. 14A illustrates two orthogonal polarizations, TE and TM modes, of the extracted optical signal 120 in the overlay 1110. When the polarization of the output beam 1120 is perpendicular to the angled surface 1112 and thus the receiving surface of the detector 410, the reflectivities for both polarization lights are identical. Because the coupling coefficient for the TM polarization is higher than that for the TE polarization, the output intensity of the TM mode is higher than that for the TE mode. Hence, a polarization-dependent error occurs when the beam 1120 is not exactly perpendicular to the angled facet 1112. Therefore, it is necessary the angle φ be properly set to make the angled facet 1112 to be substantially perpendicular to the extracted output beam 1120 the direction of the beam 1120 can be determined from the properties of the overlay 1110, such as the index of the overlay 1110, for the fiber 140 with given properties. When the value of angle φ is correctly set, the orientation of the detector 410 around a rotation axis OX shown in FIG. 14B may be designed to increase the reflection of TM mode and to decrease the reflection of TE mode so as to reduce the effect of the polarization-dependent reflection. This is achieved at the expense of the received tap power by the detector 410. TABLE 1 lists proper values for the angle of the facet 1112 for different glass materials for the overlay 1110.

TABLE 1

| | [t2] | | | | |
|---|---|---|---|---|---|
| Index of glass, @ 1550 nm | 1.501 | 1.49 | 1.48 | 1.47 | 1.46 |
| φ, degree | 74.64° | 76.26° | 77.95° | 79.94° | 82.46° |

Figure 14B:
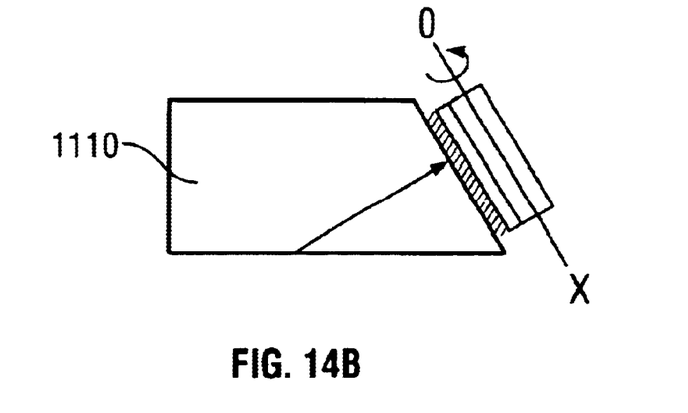
FIG. 14B shows another embodiment of a tap monitor based on the designs in FIGS. 11 and 12 and illustrates the rotation adjustment in attaching the detector to the angled facet of the overlay.
Figure 14C:
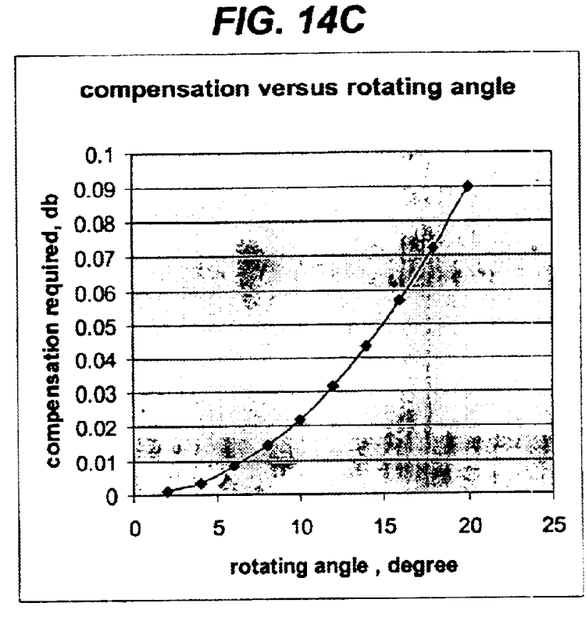
FIGS. 14C and 14D show effects of the polarization-dependent reflections in tap monitors shown in FIGS. 11, 12, and 14B.

In FIG. 14B, the detector 410 is shown to be immersed in a polymer layer 1410 with a refractive index substantially equal to the index of the overlay 1110. The detector 410 has a SiN coating 1420. Assuming the index of the polymer layer 1410 is 1.5, FIG. 14C shows the needed compensation to equalize the TE and TM reflections as a function of the rotation angle of the detector 410 where the rotation angle is the value of the angle of the detector 410 from the normal orientation of the detector 410.

Figure 14D:
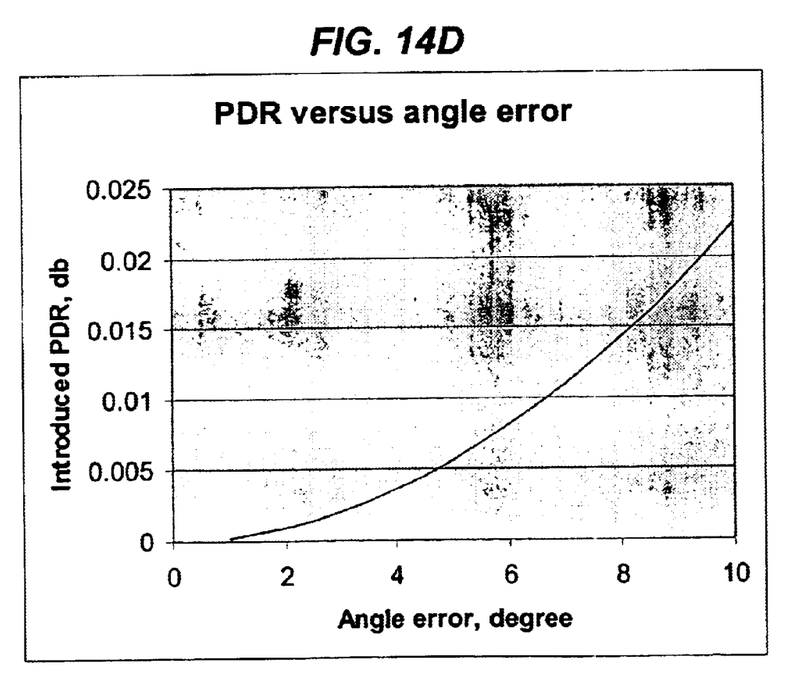

The above polarization-dependent reflection may be caused by errors in both the cut angle φ the facet 1112 and the orientation of the detector 410. FIG. 14D shows the polarization-dependent reflection as a function of the angle error. Hence, during the fabrication process, for a given angled facet 1112, the orientation of the detector 410 may be adjusted to compensate for the angle error in the cut angle φ of the fact 1112 to substantially reduce or eliminate the polarization-dependent reflection. This may be done by monitoring the signal strengths of the TM and TE modes when attaching the detector 410 to the facet 1112.

Only a few embodiments are disclosed. However, it is understood that variations and enhancements may be made without departing from the spirit of and are intended to be encompassed by the following claims.

What is claimed:

1. A device with a tap monitor, comprising:
   a waveguiding optical conduit operable to confine light and direct confined light along an optic axis;
   a surface formed on a side of said waveguiding optical conduit and positioned in a region where an evanescent field of said confined light exists;
   an optical detector coupled to said surface to receive and detect a power of said evanescent field; and
   an overlay layer formed between said surface and said optical detector and having a refractive index higher than a refractive index of said waveguiding optical conduit.

2. The device as in claim 1, wherein said waveguiding optical conduit is a fiber, and where said surface is formed by removing a portion of fiber cladding.

3. The device as in claim 2, further comprising a substrate that has a groove formed on one surface, wherein said fiber has a portion in said groove.

4. The device as in claim 1, wherein said waveguiding optical conduit is a planar waveguide formed on a substrate.

5. The device as in claim 1, further comprising:
   a variable optical attenuator formed in another portion of said waveguiding optical conduit and operable to control an amount of light remaining in said waveguiding optical conduit in response to an external control signal; and
   a controller operable to produce said external control signal in response to a detector signal produced by said optical detector.

6. The device as in claim 5, wherein said overlay layer changes a refractive index with temperature.

7. The device as in claim 6, further comprising a controllable heater in contact with said overlay layer to change and control a temperature of said overlay layer.

8. The device as in claim 1, wherein said overlay layer changes a refractive index with temperature.

9. The device as in claim 8, further comprising a controllable heater in contact with said overlay layer to change and control a temperature of said overlay layer.

10. A device with a tap monitor, comprising:
    a waveguiding optical conduit operable to confine light and direct light along an optic axis;
    a surface formed on a side of said waveguiding optical conduit and positioned in a region where an evanescent field of said confined light exists an overlay layer formed between said surface and said optical detector and having a refractive index higher than a refractive index of said waveguiding optical conduit;
    an optical detector coupled to said surface to receive and detect a power of said evanescent field;

a variable optical attenuator formed in another portion of said waveguiding optical conduit and operable to control an amount of light remaining in said waveguiding optical conduit in response to an external control signal; and a controller operable to produce said external control signal in response to a detector signal produced by said optical detector.

11. The device as in claim 10, wherein said waveguiding optical conduit is a fiber, and where said surface is formed by removing a portion of fiber cladding.

12. The device as in claim 11, further comprising a substrate that has a groove formed on one surface, wherein said fiber has a portion in said groove that includes said surface.

13. The device as in claim 10, wherein said waveguiding optical conduit is a planar waveguide formed on a substrate.

14. The device as in claim 10, wherein said overlay layer changes a refractive index with temperature.

15. The device as in claim 14, further comprising a controllable heater in contact with said overlay layer to change and control a temperature of said overlay layer.

16. The device as in claim 10, wherein said waveguiding optical conduit is a fiber, and where said surface is formed by removing a portion of fiber cladding.

17. The device as in claim 16, further comprising a substrate that has a groove formed on one surface, wherein said fiber has a portion in said groove that includes said surface.

18. The device as in as in claim 10, wherein said waveguiding optical conduit is a planar waveguide formed on a substrate.

19. A device with a tap monitor, comprising:

a waveguiding optical conduit operable to confine light and direct confined light along an optic axis;

a side surface formed on a side of said waveguiding optical conduit and positioned in a region where an evanescent field of said confined light exists;

a waveguide overlay formed above said side surface with a refractive index greater than a refractive index of said waveguiding optical conduit to extract a fraction of light out of a guide mode via evanescent coupling to produce a monitor signal in said waveguide overlay, said waveguide overlay having an end facet which forms an acute angle with respect to said side surface to receive said monitor signal; and an optical detector coupled to said end facet of said waveguide overlay to receive and detect said monitor signal.

20. The device as in claim 19, wherein said waveguiding optical conduit is a fiber, and where said side surface is formed by removing a portion of fiber cladding and said index of said waveguide overlay is greater than a refractive index of fiber core of said fiber.

21. The device as in claim 20, further comprising a substrate that has a groove formed on one surface, wherein said fiber has a portion in said groove that includes said side surface.

22. The device as in claim 19, wherein said waveguiding optical conduit is a planar waveguide formed on a substrate.

23. The device as in claim 19, further comprising:

a variable optical attenuator formed in another portion of said waveguiding optical conduit and operable to control an amount of light remaining in said waveguiding optical conduit in response to an external control signal; and a controller operable to produce said external control signal in response to a detector signal produced by said optical detector.

24. The device as in claim 19, wherein said acute angle and an orientation of said detector are set to substantially equalize intensities of TM and TE polarizations in received light at said detector.

* * * * *